Aug. 1, 1933.    E. M. HAWKINS ET AL    1,920,389
SHEARING MECHANISM
Filed Aug. 22, 1930    11 Sheets-Sheet 1
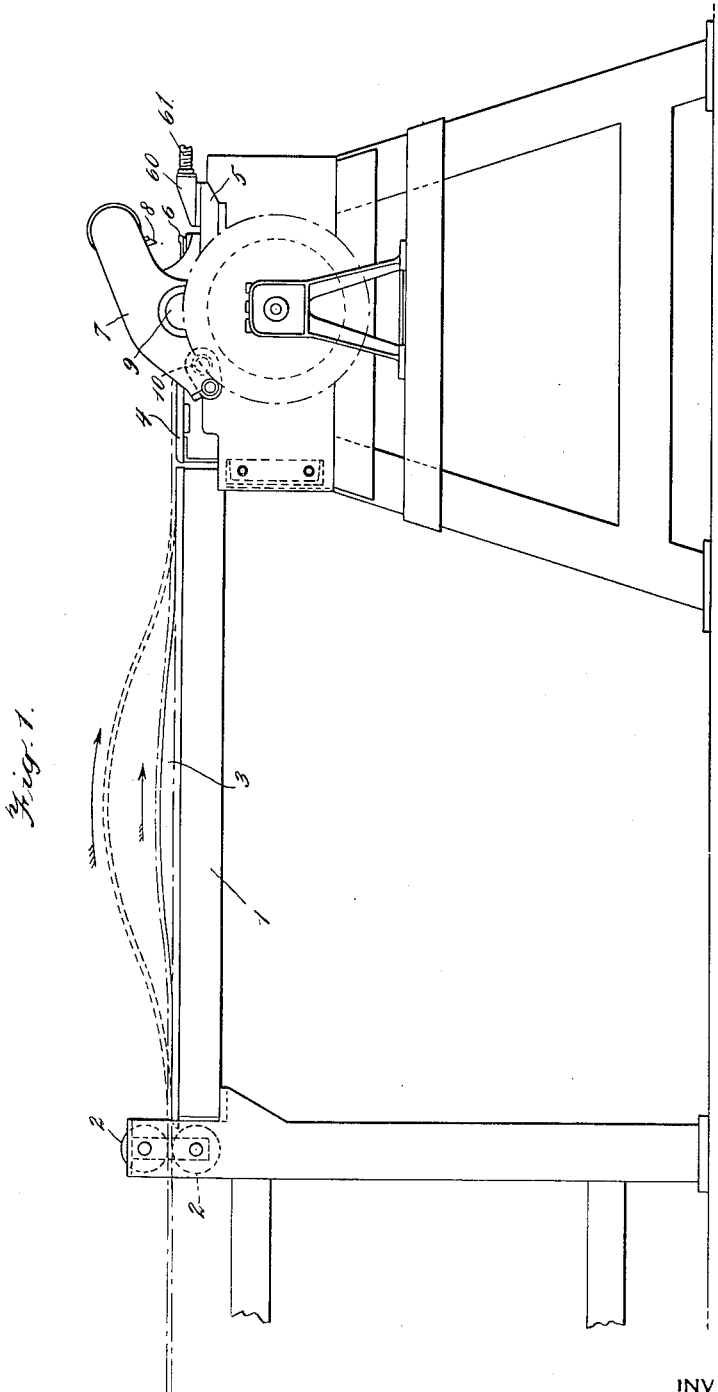
INVENTORS
ATTORNEY

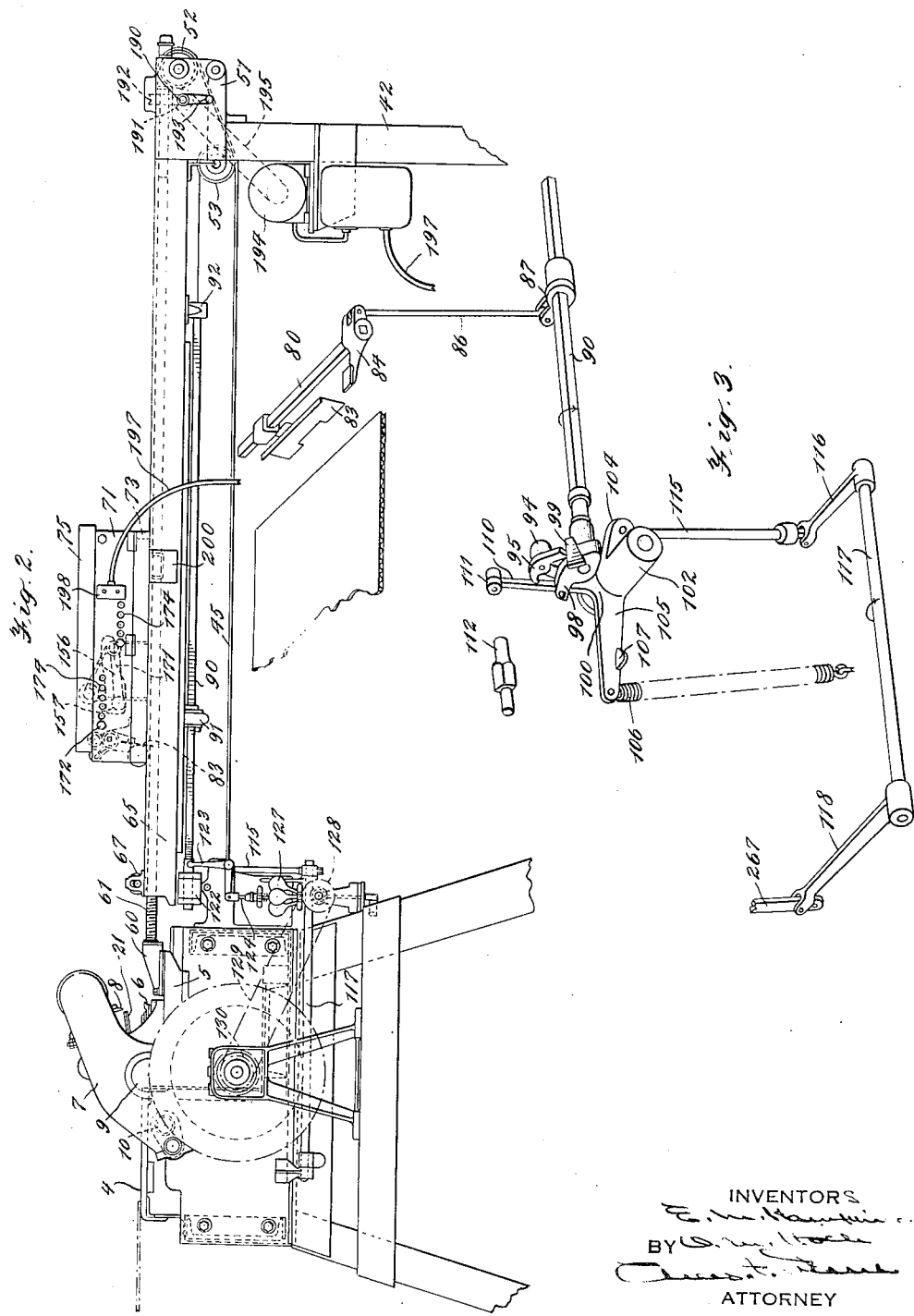

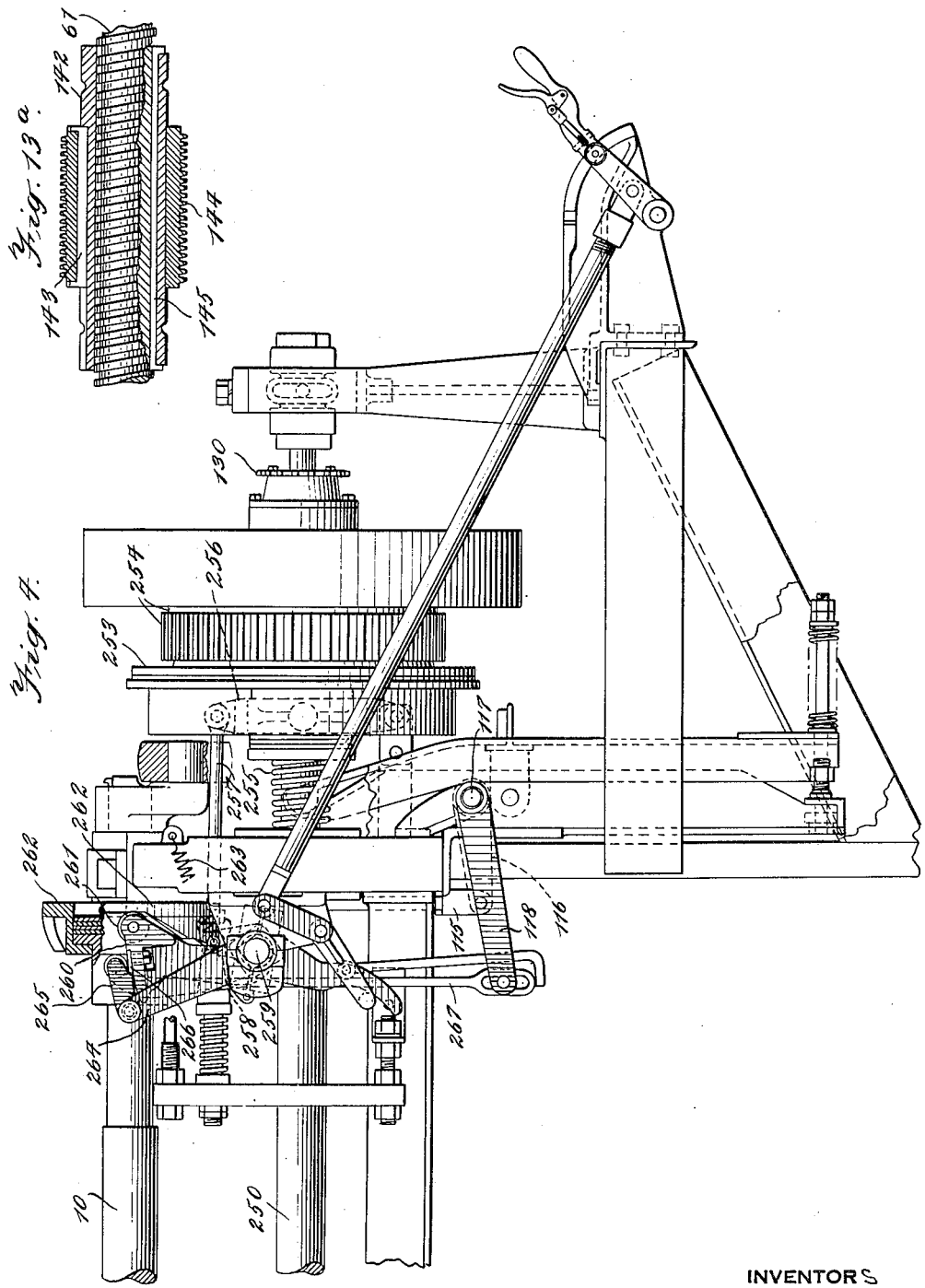

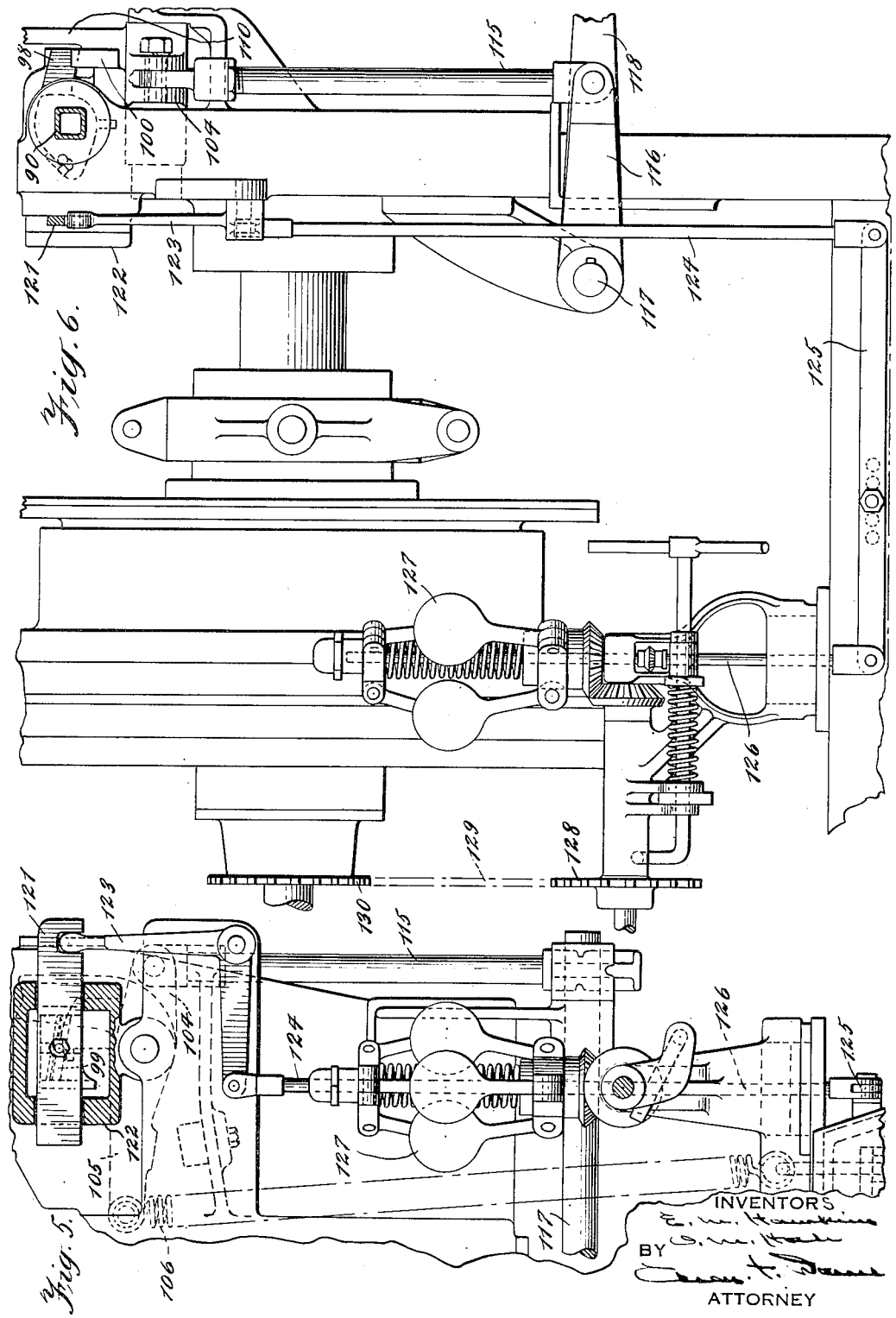

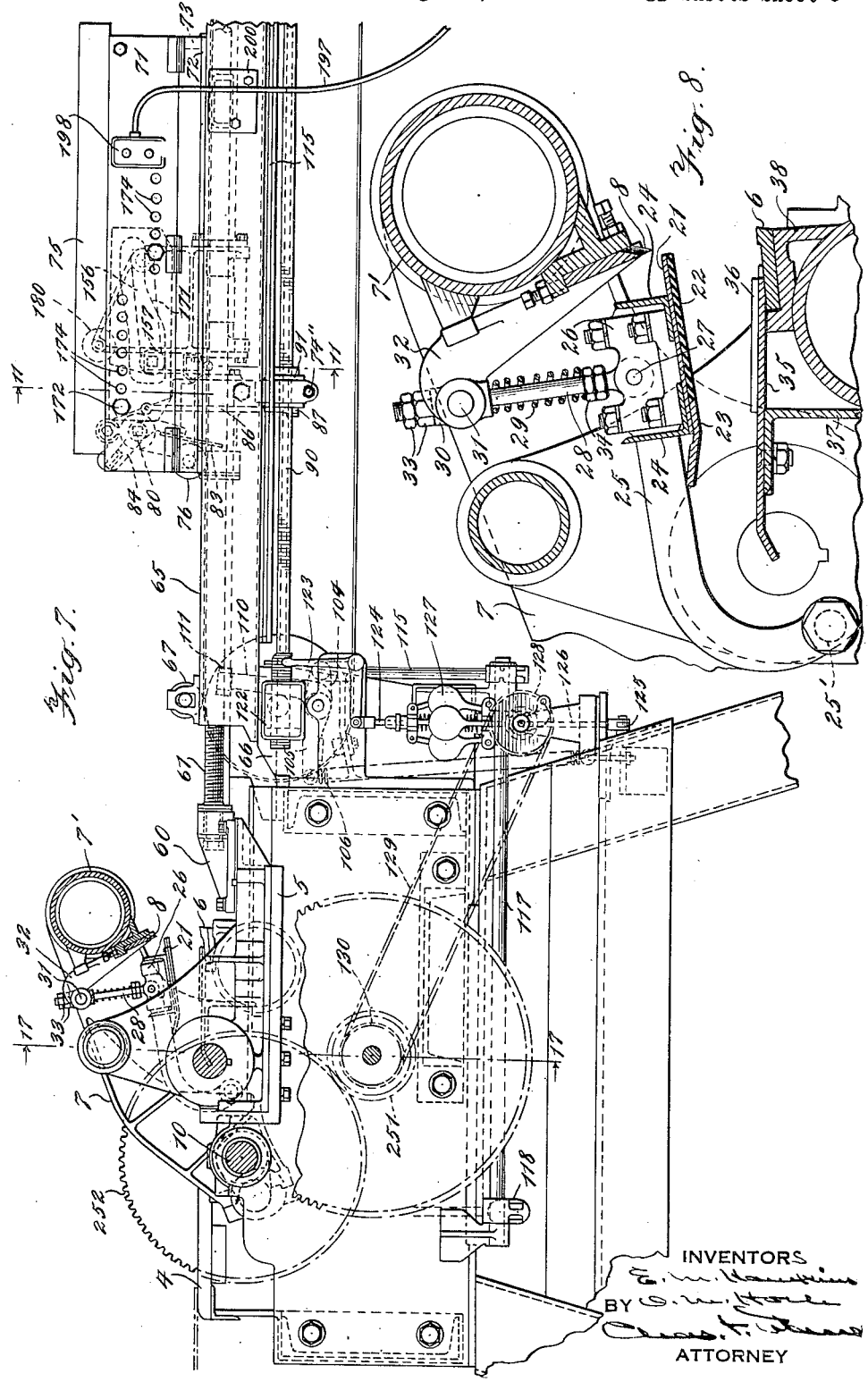

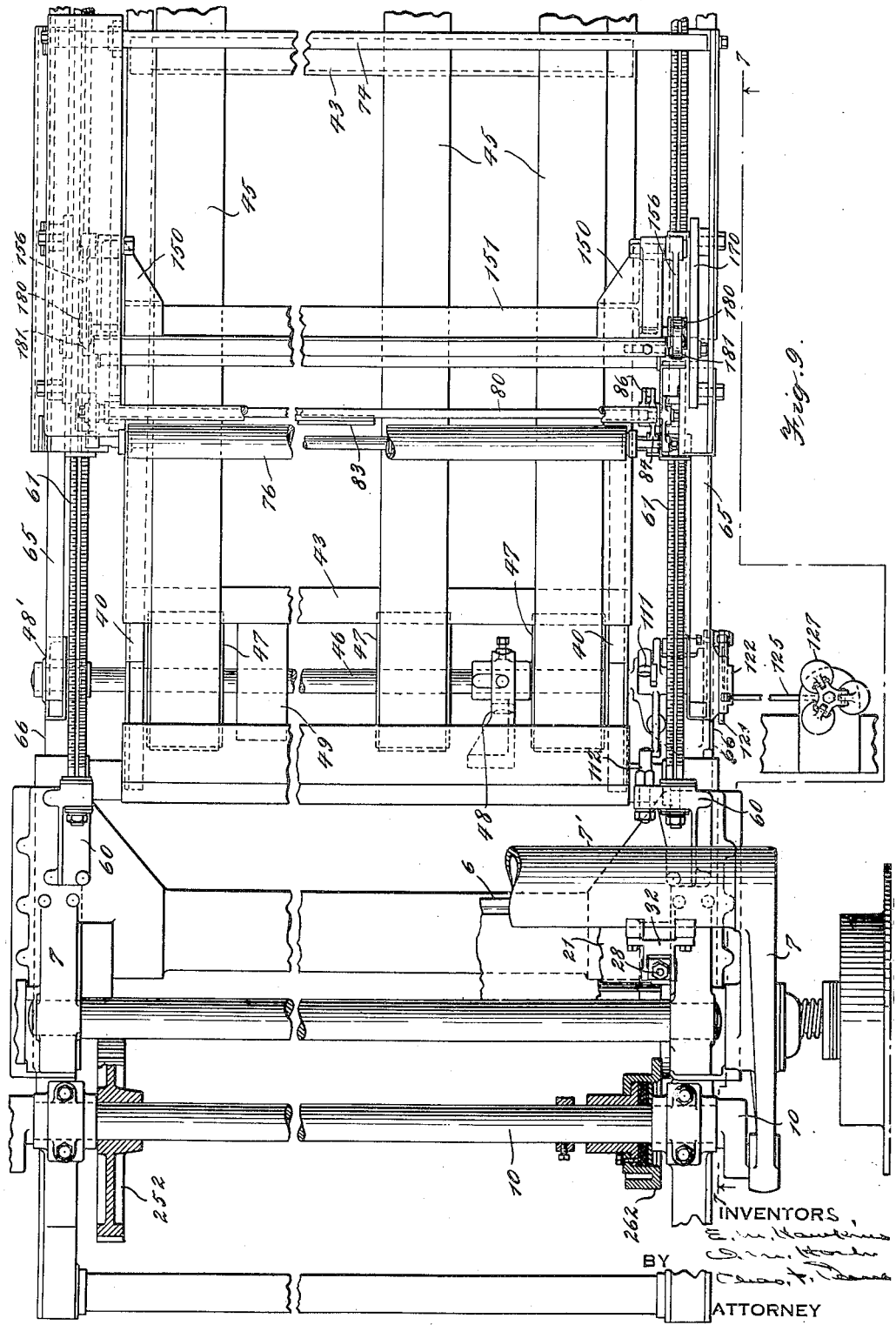

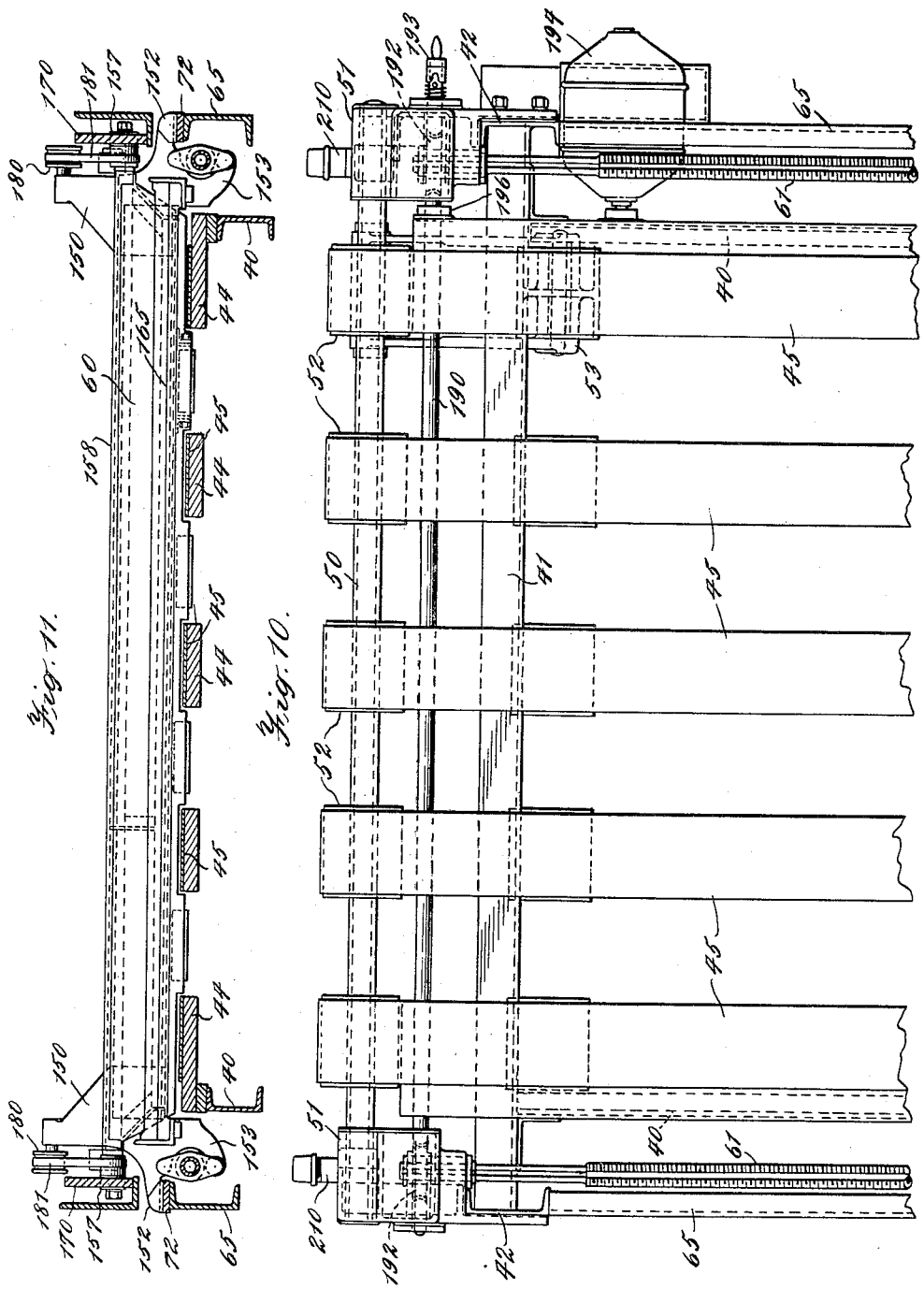

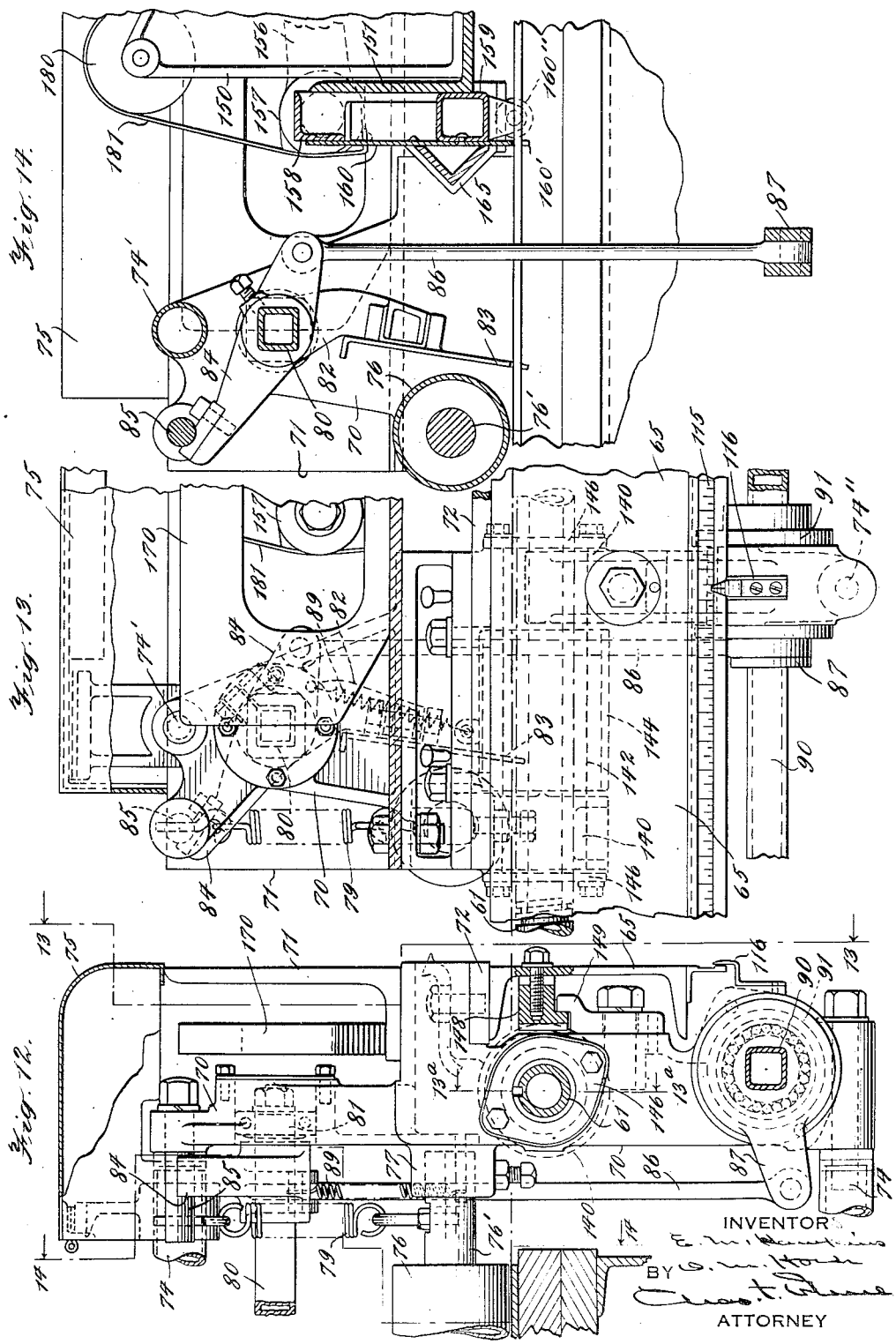

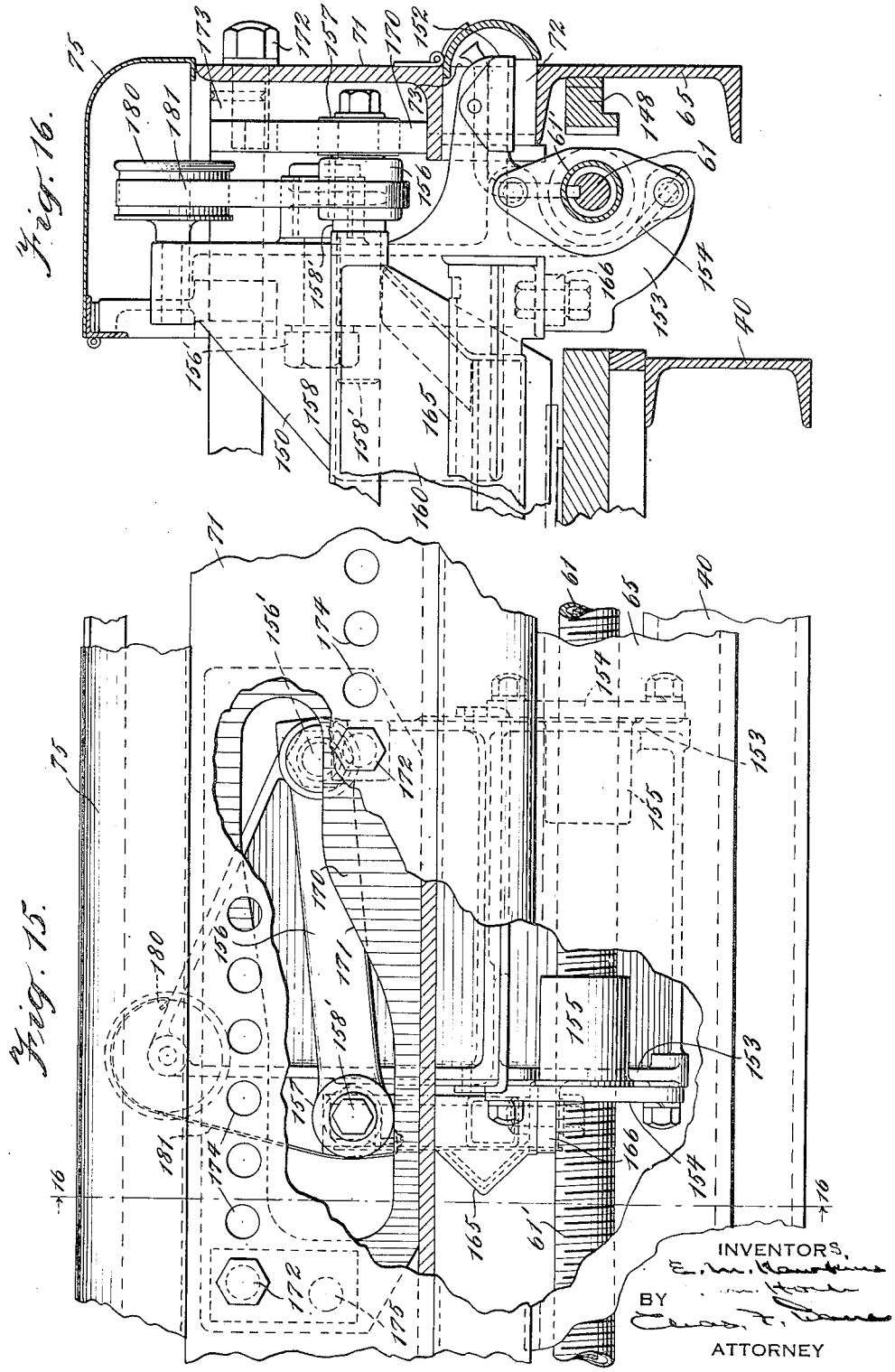

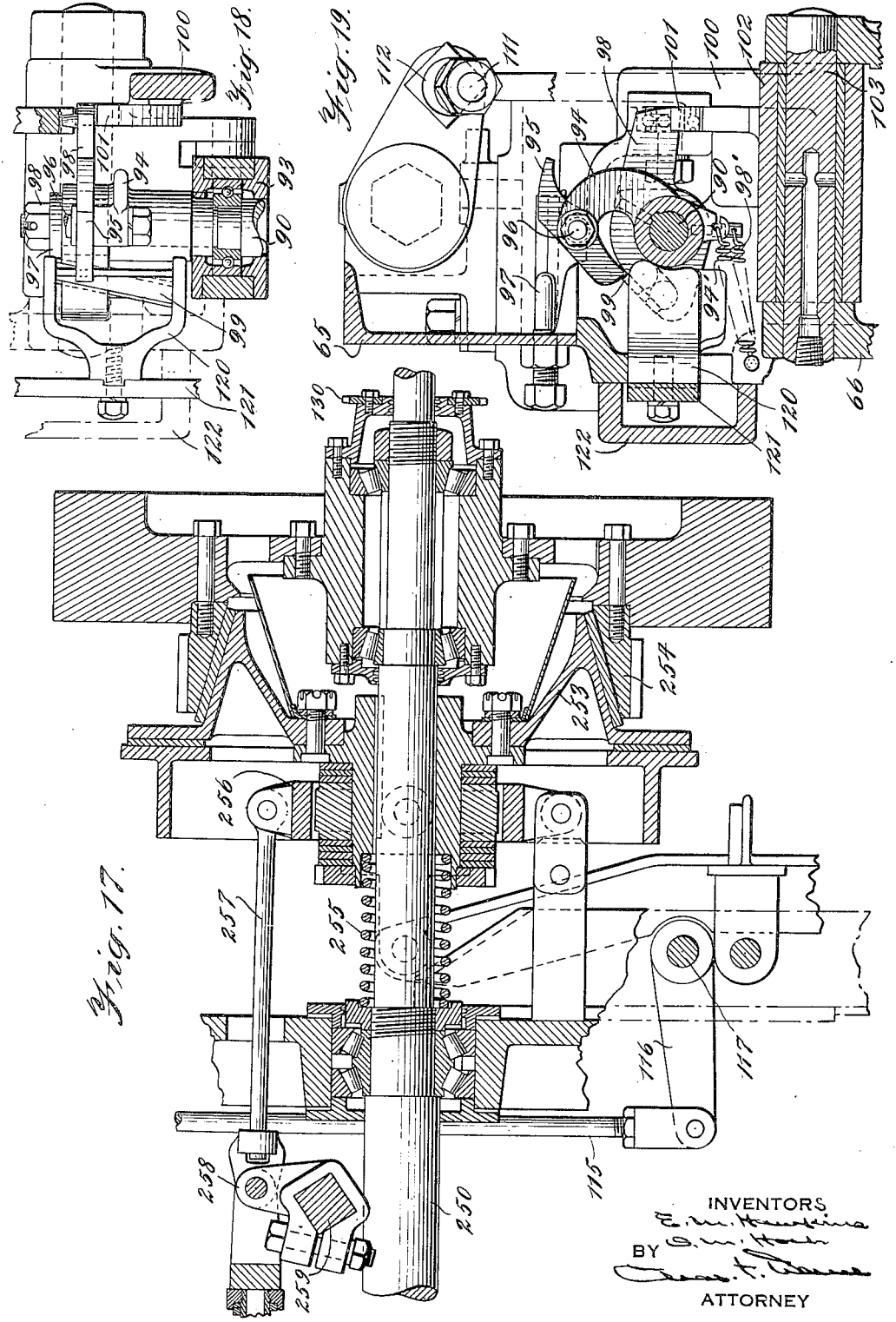

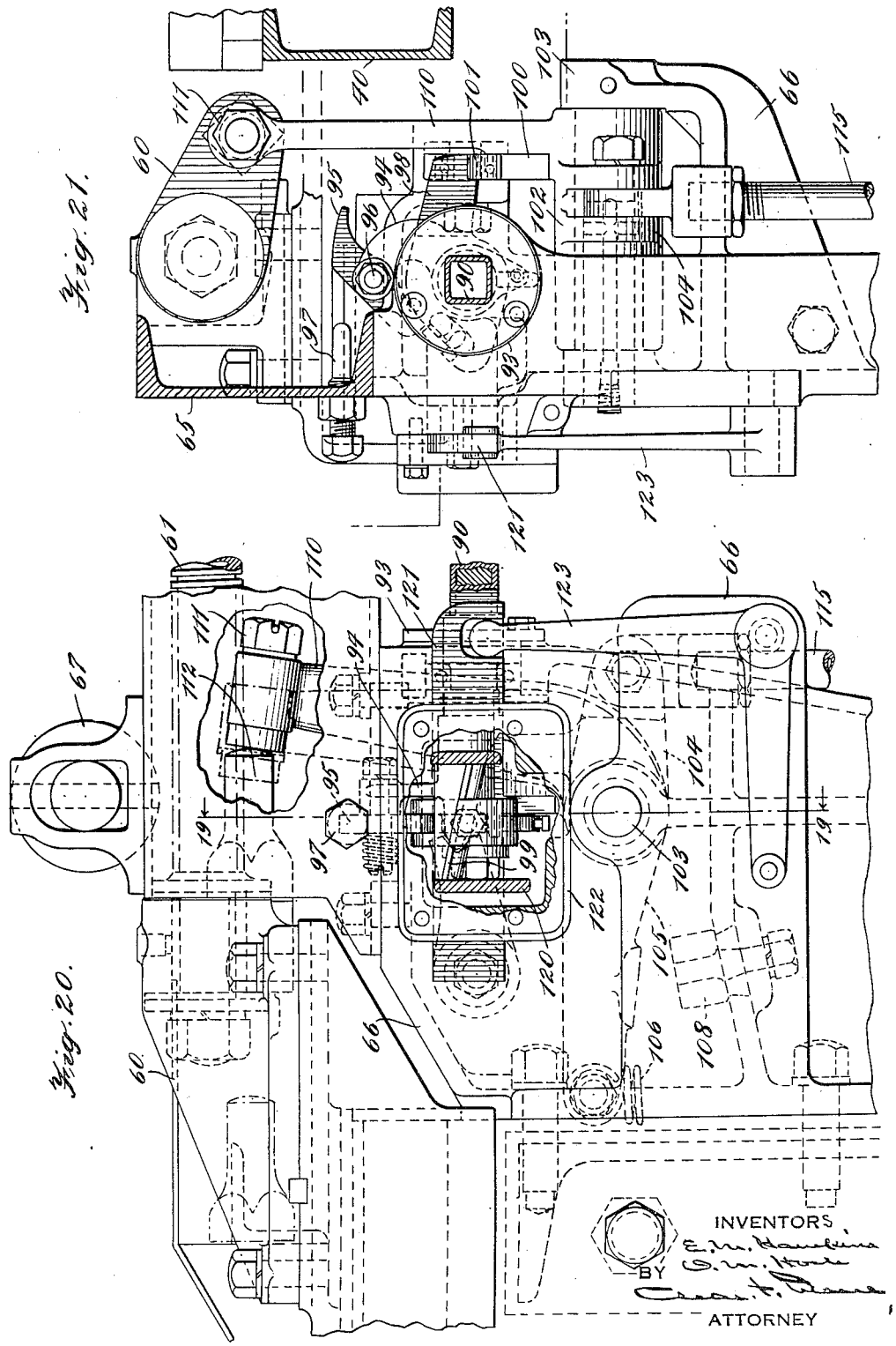

Patented Aug. 1, 1933

1,920,389

UNITED STATES PATENT OFFICE 1,920,389

SHEARING MECHANISM

Edgar M. Hawkins and Otto M. Hoch, Rochester, N. Y., assignors to M. D. Knowlton Company, Rochester, N. Y., a Corporation of New York Application August 22, 1930. Serial No. 477,058

45 Claims. (Cl. 164—49)

The invention relates to certain improvements in machines for cutting sheets or sections of predetermined, uniform lengths from continuously moving webs, such as cardboard, corrugated paper board and the like, of the general type exemplified in the patents to Hoch No. 1,321,039 of November 4, 1919, and Hawkins No. 1,321,207 of November 11, 1919, and has for its object to provide machines of this general type with a special form of trip mechanism controlled by the advancing edge of the web for initiating the cycle of operations involved in the cutting or severing of each section, associated with a barrier or stop device operating to accurately fix and determine the length of the section to be cut, prior to each cutting operation, the trip mechanism being associated with means for automatically varying the time of initiating or starting the shearing cycle by and in accordance with the speed of operation of the machine, namely, to delay the starting of the shear mechanism, when the speed of the machine increases and to advance or accelerate the starting of the said shear mechanism when the speed of the machine declines, thereby aiding in the cutting of sheets of uniform lengths from the web for each setting or adjustment of the machine irrespective of the change in the speed of operation of the machine, the length of the cut sheets being determined by the distance between the cutting knives and the barrier, which latter, with the trip device, is adjustable longitudinally of the delivery table to effect the cutting of sheets of different lengths.

The invention is illustrated in the accompanying drawings, in which:—

Fig. 1 is a side elevation of the fore part of the machine, including the feed table and shear mechanism, shown more or less diagrammatically.

Fig. 2 is a similar view showing the shear mechanism and the delivery table.

Fig. 3 is a diagrammatic perspective of a portion of the trip mechanism.

Fig. 4 is a partial side elevation showing the clutch mechanism.

Fig. 5 is a fragmentary side elevation of the automatic means for varying the operation of the trip mechanism.

Fig. 6 is an end elevation thereof.

Fig. 7 is a fragmentary side elevation of the machine with part of the shear mechanism in section.

Fig. 8 is an enlarged fragmentary section of the shear mechanism.

Fig. 9 is a partial plan view of the shear mechanism and the delivery table with certain of the elements of the former omitted.

Fig. 10 is a plan view of the discharge end of the delivery table.

Fig. 11 is a section on line 11—11 of Fig. 7.

Fig. 12 is a fragmentary sectional elevation of a portion of the trip carriage and its accessories.

Fig. 13 is a section on line 13—13 of Fig. 12.

Fig. 13a is a sectional detail view of the worm drive.

Fig. 14 is a section on line 14—14 of Fig. 12.

Fig. 15 is a fragmentary side elevation, illustrating certain details of the barrier carriage.

Fig. 16 is a section on line 16—16 of Fig. 15.

Fig. 17 is a sectional elevation of the clutch and its associated parts.

Fig. 18 is a fragmentary plan, partly in section, of the adjustable elements of the trip mechanism.

Fig. 19 is a section on line 19—19 of Fig. 20.

Fig. 20 is a fragmentary side elevation of a portion of the trip mechanism.

Fig. 21 is an end elevation, partly in section, of the mechanism shown in Figs. 19 and 20.

Referring particularly to Fig. 1 of the drawings, 1 indicates the feed table generally, onto which the continuous web is fed from the forming machine, as, for example, a machine for making corrugated paper board in continuous lengths, said table being provided at its front end with the usual feed rollers 2, 2 and at its rear end being connected to the cutter or shear mechanism, which latter is of the general type shown in the Hawkins patent aforesaid. The top of the table is provided with means for producing a slight deflection or upward bend in the travelling web between the feed rollers and the shear mechanism, and, as shown, this means comprises a rounded elevation 3 in the surface of the table, but it will be understood that the desired result may be obtained by various other means, as, for example, by securing transversely of the table top a strip of wood or metal having rounded or beveled sides, or, when the table top is fitted with transverse rollers, either making the middle roller of larger diameter than the others or raising the axis of said middle roller above the plane of the axes of the other rollers, whereby the upper surface of said middle roller will be above the corresponding surfaces of the rollers on each side thereof.

The feed table is placed in advance of the shear mechanism for cutting the web into uniform predetermined lengths or sheets from the moving web, the latter being delivered from the feed table to a table section 4 on the shearing machine proper, which latter involves a frame 5 slidable on guides on the top of the machine in a direction parallel to the direction of movement of the web to be cut, a stationary knife 6 on said frame, and a cutter frame 7 pivoted to the slidable frame 5 and having at one end a transverse knife or cutter 8 cooperating with the knife 6, the opposite end of the cutter frame 7 being extended to the rear of its pivotal axis 9 and connected to a crank shaft 10, which is intermittently operated through a complete revolution by clutch controlled gearing driven from a main drive shaft, the rotation of the crank shaft effecting a forward movement of the sliding frame 5, a concurrent swinging of the pivoted cutter frame 7 to bring the knives 8 and 6 together and shear a sheet or section from the web, followed by a complete reverse movement of the frame 5 and the pivoted cutter frame to their initial positions, when the rotation of the crank shaft is stopped, all as more particularly described in the Hawkins patent aforesaid. The construction and arrangement of the clutch and its controlling and actuating means are substantially the same as shown in the said Hawkins patent and, therefore, need not be specifically described herein, except as to certain ancillary features constituting a clamp or brake for clamping the web to the table of the shearing machine just before the swinging knife 8 engages the web in the shearing operation.

This clamp, as more particularly shown in Figs. 7 and 8, includes a metal plate 21 having a facing 22 of sheet rubber or the like and in front of which is a strip of steel 23 with an upwardly inclined forward edge to engage and guide the advancing web between the members of the clamp. The plate 21 is secured to angle irons or bars 24, 24, which are bolted to head pieces 26 formed on the ends of arms 25, pivoted on studs 25', mounted on the opposite side members of the rocking cutter frame 7, which carries the upper knife 8. In order that the upper member of the clamp may be moved with the upper knife a slight distance ahead of the latter in effecting the clamping of the web, and also to permit said clamping member to yield sufficiently to prevent crushing the web, each of the heads 26 is connected by a pin 27 to an eye on the lower end of a rod 28, the upper end of which rod passes through a swivel-block 30 carrying a pintle 31 journaled in bearings formed in a bracket 32 connected to the front cross member 7' of the swinging frame 7. Each rod 28 carries a helical spring 29, which is confined between the swivel-block 30 and adjustable set and lock nuts 34 threaded on the lower part of the rod 28. The outer end of each rod 28 is provided with nuts 33, by means of which the setting of the upper member of the clamp may be effected. By adjusting the nuts 34, the tension of the springs 29 may be regulated, so that the proper degree of pressure may be imposed on the web by the shoe or upper member of the clamp without danger of crushing or marring the web. The upper shoe of the clamp cooperates with a stationary plate 35 fixed to the sliding frame 5 in advance of the lower knife 6, by means of an angle bar support 37 and the support 38 which carries said knife. Mounted on top of plate 35 are stops 36, which lie below the projecting ends of the angle irons 24, 24, which carry the shoe or upper member of the clamp and serve to arrest the downward movement of the latter a sufficient distance above the plate 35 to avoid crushing a fragile web, such as lined corrugated paper board. The stops 36 are made of sufficient height to accommodate any given thickness of the web, and may be removable and interchangeable to accommodate different thicknesses of web or, if desired, may be adjusted as to height by interposing shims of spacers beneath them or by means of set screw connections with the plate 35.

Secured to the rear part of the supporting frame of the shearing machine by means of brackets 66, is the delivery table, which comprises longitudinal channel beams 40, 40 connected at their outer ends by a cross beam 41, which is supported by channel iron legs 42, said longitudinal beams being connected at intervals by cross beams 43, 43, which, together with the end cross beam 41, support longitudinal bars or slats 44 (see Figs. 9 and 11), preferably of wood, over which delivery belts 45 operate. These belts are driven by pulleys 47 mounted on shaft 46 journaled in bearings 48, 48' carried by the shear mechanism frame. Said shaft 46 is driven by a pulley 49, which is of less diameter than the pulleys 47, to prevent interference with the web of sheet material carried on top of the delivery table. The pulley 49 is driven by an appropriate belt connection with the drive which operates the shear mechanism, and is driven at a speed to cause the belts 45 to travel at a considerably higher rate of speed than that at which the web material is fed to the machine, whereby each sheet, as it is cut from the web, is moved with sufficient rapidity to leave a considerable gap between its rear edge and the advance edge of the continuous web. The belts engage idler pulleys 52 carried by a transverse shaft 50 journaled in bearings mounted in brackets or housings 51 secured to the discharge end of the table, as shown in Figs. 2 and 10, and proper tension is maintained on each of said belts by belt tighteners, such as indicated at 53. Secured to opposite sides of the sliding frame 5 of the shear mechanism are brackets 60, in which are journaled the ends of two screw shafts 61, the outer ends of which are slidably mounted in bearings in the housings 51, said shafts having key-ways substantially throughout their lengths. Said screw shafts are designed to effect adjustment of the trip and barrier carriages with respect to the shear mechanism to regulate the length of the sheets cut from the fabric and to insure the uniformity of the cut sheets for a given setting, as will be hereinafter more particularly explained.

The trip carriage, which also carries the barrier mechanism, comprises two composite castings 70 located on opposite sides of the delivery table, to which castings are bolted angle iron face plates 71 and slides or runners 72, the latter engaging and sliding on longitudinal rails 65, in the form of channel beams, which are disposed on opposite sides of the delivery table parallel with the rails 40, said rails 65 being supported at one end by brackets 66 on the shear mechanism frame and at their opposite ends on the table legs 42. The outer ends of the face plates 71 are connected to the slides 72 by spacer blocks 73, and the two side frames of the carriage, comprising the castings 70 and the face plates 71, are secured in properly spaced relation by cross ties 74, 74' and 74", as shown in Figs. 12, 13 and 14. Each of the side frames is provided with a cover 75, which may be hinged to the upper portion of the corresponding frame and serves to partially enclose and protect the mechanism carried by the side frames.

Journaled on shaft 76', which is supported at its ends in bearings 77 formed in the castings 70 to permit vertical adjustment of said shaft, is a presser roll 76, which cooperates with one or more rolls 67, mounted in slotted bearings carried by the rails 65, to hold the travelling web flat in its passage over the delivery table to the trip and barrier mechanism. In order to prevent the entire weight of the roll 76 being imposed on the web, with the possibility of crushing or marring the same, when it is of a fragile character, a portion of the weight of the roll is supported by helical suspension springs 79 connected to the shaft 76' and to the upper part of the castings 70. The roll 76, therefore, insures the proper presentation of the forward edge of the web to the trip plate.

Journaled in anti-friction bearings 81 mounted in the upper portions of the castings 70 is a shaft 80, the body portion of which is square in cross section and to the middle of which is secured an arm 82 to which is attached a trip plate 83, the lower edge of which lies in the path of movement of the forward edge of the advancing web and is engaged by said edge and moved therewith backward and upward until the lower edge of the trip plate clears the edge of the web and rides on the upper surface of the latter. This swinging movement of the trip plate causes a partial rotation of the shaft 80 and with the latter an attached rocker arm 84, one end of said rocker arm moving out of engagement with a stop pin 85 mounted on the upper portion of one of the side frame castings 70 and the other end of said arm 84 being connected to a lift rod 86, the lower end of which is connected to a crank arm 87 (see Figs. 12 and 13) mounted on a square shaft 90 running longitudinally of the delivery table and having round sections journaled in anti-friction bearings 91, 92 and 93, mounted in a downward extension of the adjacent casting 70, on the under side of the adjacent rail 65 and on the bracket 66, respectively. A spring 89 connected to the lower portion of the rocker arm 84 and to the trip carriage serves to return the trip plate 83 to its normal position, when the severed sheet of fabric passes out of engagement with said trip plate.

Keyed to a round section of the shaft 90, adjacent the bearing 93 (see Figs. 3, 18–21) is a curved arm 94, to the outer end of which a pawl 95 is pivoted on a stud 96, and loosely mounted on the shaft 90 adjacent the pawl 95 is a latch 98, which is held in position by a washer and lock nut. The nose of the pawl 95 is adapted to cooperate with an inclined or tapered adjustable gag or detent 99, which is slidably mounted in the hub of the latch 98, the coaction between the nose of the pawl and the gag being such that the tripping of the latch by the pawl may be accurately timed, as will be hereinafter explained. An adjustable pin 97, mounted on rail 65, engages the upper or tail portion of the pawl 95, as the latter approaches the limit of its swinging movement, due to the partial rotation of the shaft 90 by the trip plate 83, said pin serving to disengage the nose of the pawl from the gag 99 and permit springs 94' and 98', which are connected to bosses on the hubs of the arm 94 and the latch 98, to restore the pawl and the latch to their normal positions.

The outer end of the latch 98 normally engages a shoe or detent 101 on a compound rock lever 100 having a hub 102 journaled on a pintle 103 mounted in bracket 66, said rock lever having three arms 104, 105 and 110, the first of which, 104, is connected to a link or pull rod 115, the second, 105, having attached at its outer end a spring 106, which is anchored to the shear frame at its lower end and which effects the swinging movement of said rock lever when the same is released by latch 98, and the third arm 110 carries on its upper end a screw stud 111, which is engaged by a ram or abutment 112, mounted in a lateral extension of bracket 60 to which the adjacent screw shaft 61 is attached and which is carried by and moves with the sliding shear frame, which ram, therefore, serves to swing the rock lever 100 back to its locking engagement with the latch 98 as the shear carriage completes its forward movement at the conclusion of each cutting operation. The movement of rock lever 100 under the influence of spring 106 is arrested by a rubber pad 108, which acts as a shock absorber.

The link or pull rod 115 is connected at its lower end to a rock lever 116 fast to a shaft 117 extending along one side of the frame of the shear mechanism, to which shaft is secured a rock arm 118, which is connected to and effects the operation of the tripping mechanism which permits the operative engagement of the members of the clutch to operate the shear through one complete cycle, which mechanism is shown in Fig. 4 and is substantially identical in construction and mode of operation with that shown and described in the patent to Hawkins aforesaid. This mechanism, in part, comprises the main drive shaft 250 having a drive connection with the crank shaft 10 of the shear mechanism through gearing 251, 252 (see Fig. 7) and the rotation of which drive shaft is controlled by a friction clutch, which latter is of the cone type and comprises the members 253 and 254, the member 254, which constitutes the driving member, being loosely mounted on the shaft to rotate freely thereon, and the member 253 being keyed to said shaft for sliding movement thereon and being normally forced into clutching engagement with the member 254 by means of a spring 255 surrounding the shaft. The means controlling the movement of the sliding member 253 to and from its position of clutching engagement with the member 254 includes a clutch lever 256 pivoted at its lower end to the machine frame and having the usual pin-and-collar connection intermediate of its ends with the clutch member 253 and at its upper end being pivotally connected with one end of a clutch rod 257, which latter at its opposite end is pivoted to an arm 258 secured to a shaft 259. Mounted loosely on this shaft 259 is a cam lever 260 which carries at its upper end a roller 261 adapted to cooperate with a cam 262 on the crank shaft 10. This cam roller is normally retained in engagement with the surface of the cam by a spring 263 connecting with the cam lever. An arm 264 secured to the shaft 259 carries at its upper end a pivoted pawl 265 which is arranged to engage a wear block 266 on the cam lever 260. When the pawl is in engagement with this wear block, it acts through the connections 264, 259, 258, 257, and 256 to maintain the clutch member 253 disengaged from the member 254 against the action of the spring 255. A rod 267, connecting the pawl with the arm 118 of the rock shaft 117 (see Figs. 3 and 4) hereinbefore referred to, acts, upon the raising of the arm 118 under the influence of the spring 106 following the release of the rock lever 100 by the latch 98, to disengage the pawl from the wear block 266 and so release the spring 255 to permit it to effect operative engagement of the clutch members 253 and 254 to cause operation of the shear through one complete cycle. Upon the completion of such cycle, the cam 262 acts through the lever 260, pawl 265, and the connections between the latter and the clutch member 253, to withdraw the latter from the driving clutch member and so effect stopping of the machine in the manner as fully set forth in the Hawkins patent aforesaid.

As before stated, the adjustable tapered gag 99 carried by latch 98 and adapted to be engaged by the pawl 95 in the tripping operation, is primarily to time the tripping of the latch and the consequent engagement of the members of the clutch to initiate each shearing operation, relative to the movement of the trip plate 83 by the advance edge of the moving web, thereby to regulate the position of said edge relative to the barrier when the shear is started, and to aid in equal and uniform lengths of the web being cut for any given setting of the machine. The said gag is automatically adjusted to compensate for variations in the speed of operation of the shearing mechanism, which variations would otherwise result in a shortage of stock in front of the barrier when the speed increases and a needless surplus of stock in front of the barrier when the speed decreases. The mechanism for adjusting the gag is as follows: Slidably mounted in a housing 122 secured to the bracket 66 is a bar or slide 121 to which is fixed a fork 120, which straddles the gag 99 lengthwise, so that any longitudinal movement of the bar 121 will cause a corresponding longitudinal movement of the gag in its seat on the hub of the latch 99, so that the nose of the pawl 99 will trip the latch 98 at an earlier or later instant in the swinging movement of said pawl and consequently at an earlier or later period in the movement of the trip plate 83 under the action of the advance edge of the web. The slide 121 is engaged by the upper end of a bell crank lever 123 pivoted to bracket 66, the other or horizontal end of the bell crank being connected to lift rod 124 (see Figs. 5 and 6), which is attached at its lower end to a rock lever 125 adjustably pivoted intermediate its ends to a cross bar of the shear frame, the other end of said rock lever 125 being connected to the shaft 126 of a centrifugal governor 127, which centrifugal governor is driven by chain and sprocket gearing 128, 129 and 130 from the constantly moving clutch member 254 (see Figs. 4, 6 and 17), so that, when the speed of the clutch varies, the centrifugal governor, through the connecting linkage with the slide 121, will move said slide and the gag 99 commensurately to cause the earlier or later tripping of the latch by the pawl 95, as explained.

The trip carriage, when the machine is set for cutting sheets of any predetermined length, is stationary, but is adjustable longitudinally of the delivery table along with the barrier carriage mounted thereon, in accordance with the desired lengths of the sheets to be cut from the continuously moving web. To effect this adjustment of the trip carriage with respect to the shear, each of the side castings 70 is provided with two spaced hubs or collars 140, 140, which are traversed by screw shafts 61, each pair of hubs forming bearings for a sleeve 142, which is held from longitudinal movement by end plates 146 bolted to the outer faces of said hubs, as shown in Figs. 12 and 13. Each of said sleeves 142 is traversed by one of the screw shafts 61 and is connected thereto by a key 145 (see Fig. 13a) which engages the longitudinal key-way in the shaft and a key seat in the interior face of the sleeve, so that each sleeve will partake of any rotation of its associated screw shaft, but the latter is capable of free reciprocation in the sleeve. Mounted on each of said sleeves 142 and connected thereto by a key or spline 143 is an exteriorly threaded thimble 144, which constitutes a worm, which rotates with the sleeve when the latter is rotated by its associated screw shaft 61. Each worm 144 meshes with a rack bar 148 bolted to the inner face of the corresponding rail 65 secured to the delivery table. Each of said rack bars 148 is engaged by a shouldered gib or clip 149 bolted to the outer face of the corresponding trip carriage casting 70, said clips serving to hold the carriage securely in position and prevent lateral movement thereof on its supporting rails 65. Each of the thimbles 144, constituting the worm, is finished to effect a snug fit between the inner faces of the hubs 140, so that there is no lost motion between the parts.

The barrier carriage comprises two side castings 150 connected by a cross beam 151 of right-angle cross section, each of said castings 150 having a lateral shoulder or shoe 152, which engage the slides or runners 72 of the trip carriage, so that the barrier carriage is supported on the trip carriage and may be freely reciprocated thereon. As shown in Figs. 15 and 16, each side casting has a pendent section with end walls 153, recessed to receive two interiorly threaded sleeves or nuts 155 having flanges 154 on their outer ends by means of which they are bolted to the walls 153, so that each pair of nuts extend inwardly of the side frame structure and may be accurately adjusted in their mountings by interposing shims between the flanges 154 and the end walls 153. The threaded interior of each nut is engaged by the corresponding screw shaft 61, so that the barrier carriage will move with said shafts, as the latter are reciprocated by the sliding frame of the shear mechanism, and will be adjusted longitudinally of the delivery table, simultaneously with the adjustment of the trip carriage, to vary the lengths of the sheets cut from the web, when said screw shafts 61 are rotated.

The barrier comprises a plate 160, backed by frame members 158 and 159, which guide and support the barrier in engagement with the vertical face of the cross beam 151 of the carriage, as shown in Figs. 14 and 15. The upper portions of the ends of the barrier are provided with trunnions 158' on which are mounted rollers 157, which engage the cam surfaces 171 formed in the slotted plates 170, supported on the angle face plates 71 of the trip frame, each cam plate being adjustably secured to the corresponding face plate 71 by bolts passing through appropriate members of two longitudinal series of holes 174 formed in said face plates, and engaging threaded openings in the cam plates. The arms 156, pivoted at one end to each of the side frames of the barrier carriage by studs 156', are connected at their other end to the trunnions 158' and, therefore, serve to guide the barrier in a substantially vertical direction, as the rollers 157 ride up and down the cam surfaces 171. The vertical movement of the barrier is further assured by the disposition of the stripper bar 165, which is bolted to lugs 166 on the side frame castings 150 and abuts the front plate 160 of the barrier. The lower edge of the barrier lies adjacent the upper face of the delivery table in position to be engaged by the forward edge of the web and is preferably formed with spaced extensions 160' depending below the table belts, as shown in Fig. 14, to assure engagement of the web therewith. The positioning of the barrier with respect to the shear mechanism determines the lengths of the cut sheets and, as stated, the initial position of the barrier is determined by the adjustment of the trip carriage and the barrier carriage, mounted thereon, by the screw shafts 61, which connect the barrier carriage rigidly with the sliding frame 5 of the shear mechanism, so that the barrier carriage moves with the sliding frame of the shear mechanism, while the trip carriage remains stationary.

When the advance end of the web engages the barrier plate 160, after having caused the trip plate 83 to trip the clutch, it maintains such engagement during the forward movements of the shear carriage and barrier carriage toward the discharge end of the table and, when the rollers 157 engage the inclines of the cams 171, the barrier is lifted, permitting the severed sheet to pass thereunder and, in order to prevent the barrier from marring the surface of the sheet upon the return stroke of barrier, rollers 160'', shown in Fig. 14, are mounted on the under face of the barrier in a position to ride on top of the cut sheet while it is passing off the table.

As the weight of the barrier is considerable and would be likely to damage fragile webs, a large element of the weight is taken up by means of spring drums 180 mounted on the upper portions of each of the side castings 150, which spring drums are connected to the ends of the arms 156 by straps 181.

As hereinbefore stated, the trip carriage and the barrier carriage are adjusted longitudinally of the delivery table to fix and determine the lengths of the sheets to be cut from the moving web by means of the screw shafts 61 and, as in the normal setting of the machine to cut sheets of the desired length, the two carriages are adjusted simultaneously, means are provided for rotating said screw shafts 61 together, said means comprising a cross shaft 190 journaled in the housings 51 at the discharge end of the table, which shaft is provided with worms 191 meshing with worm gears 192, which latter are connected to the respective screw shafts 61 by splines engaging the longitudinal key-ways in said screw shafts. The shaft 190 is driven by chain and sprocket connection 195 with an electric motor 194 mounted on the frame of the delivery table, which motor is controlled by reversing switch 198, preferably mounted on the side of the trip carriage and connected with the starting box of the motor by a flexible connection 197 to permit the motor to be driven in either direction and the operation thereof may be regulated by the attendant. Preferably, the shaft 190 is also fitted with a crank handle 193 to permit the adjustment of the carriage to be effected manually, if desired, and the crank handle is of the type that is normally disengaged from operative engagement with the shaft by a spring, except when the handle is to be used.

By driving the shaft 190, either by the electric motor 194 or the hand crank 193, the screw shafts 61 are rotated and, as each of said screw shafts engages the threaded nuts 155 on each side of the barrier carriage and as the worm gears 144 carried by the sleeves 142 are journaled in the bearings 140 formed on the side castings of the trip frame, and as said sleeves 142 are splined to the screw shafts 61 and the worm gears 144 engage the racks 148, it will be seen that the trip carriage will be moved or adjusted to exactly the same extent as the barrier carriage, as the pitch of the worm gears 144 is the same as that of the screw shafts 61. The simultaneous adjustment of the trip carriage and the barrier carriage to any desired position longitudinally of the delivery table may, therefore, be effected promptly and accurately to adapt the machine to cut predetermined and uniform lengths from the moving web.

In running webs of different characters or materials through the machine, it is often necessary or desirable to operate at different speeds, some materials of necessity having to be run through more rapidly than others. This results in a difference in the time between the engagement of the advance edge of the web with the trip plate and the time when said edge engages the barrier and may and often does necessitate changing the distance between the trip plate and the barrier. To accomplish this, it will be necessary to interrupt the means for adjusting the trip carriage, which can be effected by removing plates 200, which are bolted to the rails 65 and which carry on their inner faces sections of the rack bar 148. Before removing the plates, the trip and barrier carriages are moved simultaneously over the delivery table by operating the screw shafts 61 until the worms 144 on opposite sides of the trip carriage come directly opposite the plates 200. The removal of the plates, together with sections of the racks 148, break the connection between the trip carriage and its adjusting means, so that, when the screw shafts 61 are operated, they will be effective only in moving the barrier carriage, leaving the trip carriage stationary, the rotation of the screw shafts 61 being effected until the desired adjustment of the barrier carriage relative to the trip carriage is obtained.

Care should be taken when this adjustment is made that the rollers 157 of the barrier carriage are not in engagement with either end of the slots in the cam plates 170, and, if considerable adjustment between the trip carriage and the barrier carriage is required, it will be necessary to readjust the cam plates 170, which may be done by releasing the bolts 172 and moving the cam plates, so that the threaded openings therein will register with the appropriate openings or holes 174 in the face plates 71, after which the bolts 172 are reengaged to lock the cam plates in position. When the desired adjustment of the barrier carriage relative to the trip carriage has been effected, the plates 200 carrying the rack sections are replaced, after which the trip carriage and the barrier carriage may be adjusted to any desired position simultaneously by operating the screw shafts 61, as hereinbefore explained. Before resetting the machine and attempting to operate the same, it will be advisable to turn the same over by hand through one complete cycle to insure that there is no interference in any of the operating parts and particularly that the rollers 157 of the barrier carriage are in proper relation in the cam slots in the plates 170, that is to say, that the rollers will not contact either end of the slots in the plates 170, in the normal operation of the machine.

As the ends of the screw shafts 61 are projected beyond the discharge end of the delivery table when said screw shafts are advanced by the movement of the sliding frame of the shear mechanism, sections of tubing 210 provided with caps are tapped into the housings to receive the projected ends of the shafts 61.

In order to accurately determine the length of the sheet to be cut, a scale 115 is located on the lower flange of rail 65 and a pointer 116 cooperating with said scale is secured to the downwardly extending housing forming part of the side frame casting 70 of the trip carriage, as more particularly shown in Fig. 13.

It is sometime found advisable or convenient to operate the machine without the barrier and to cut the sheets under the control of the trip mechanism and the speed governor and, in order to put the barrier out of commission, it is only necessary to remove the upper bolts 172 connecting the cam plates 170 to the trip carriage, and swing the plates 170 on the lower bolts 172 as pivots until the upper bolts 172 can be engaged with the auxiliary threaded holes 175 in the cam plates. This will lock the cam plates in tilted position, so that the barrier will be lifted entirely out of the path of the travelling web. This is frequently found desirable when the machine is used for cutting very fragile material, which might be injured when the edges of the material engage the barrier. The locking of the barrier out of operative relation, as described, may also be effected when extreme accuracy or uniformity of the length of the sheets cut from the web is not essential.

In the operation of the machine, the web is fed from the forming machine onto the feed table 1 and a preliminary upward bend is imparted to the web by the deflection or elevated section of the table, in order to facilitate the upward bend of the web at this point, when the movement of the web is arrested during a cutting operation. From the feed table, the web passes onto the table portion 4 of the shear mechanism and is guided between the plates 23 and 35 of the clamping device and between the knives 6 and 8, thence onto the belts 45 of the delivery or takeaway table until the advance edge of the web encounters the trip plate 83, which is moved backwardly and upwardly, imparting a partial rotation to shaft 80 and a similar rotary movement to the rocker arm 84, which lifts the link or connecting rod 86, thereby imparting a partial rotation to rocker arm 87 and shaft 90. The partial rotation of the shaft 90 swings the arm 94 keyed thereto and with it pawl 95, the nose of which engages the adjustable gag 99 carried by latch 98, the continued movement of the pawl in engagement with the latch disengaging the nose of the latch from the shoulder 101 on the compound rock lever 100, thereby permitting the spring 106 to swing the rock lever on its bearings, which moves the link or connecting rod 115 upward, imparting a partial rotation to shaft 117 by means of the rock lever 116 and swinging rock lever 118 fast to the shaft 117, upward, which effects the operation of the special trip mechanism illustrated in Fig. 4, and particularly described in the Hawkins patent aforesaid, which releases the movable member of the clutch and permits the same to be forced by its actuating spring into engagement with the mating clutch member, which is geared to the crank shaft which operates the sliding frame 5 and the swinging frame 7 of the shear through a complete cycle, that is to say, a complete rotation of the crank shaft, a complete reciprocation of the carriage 5 and a complete oscillation of the swinging frame 7.

When the cycle is completed and the parts are returned to their normal positions, the movable member of the clutch is automatically disengaged and the shear mechanism is brought to a quick stop by the brake associated with the clutch. It will be seen, therefore, that the initiation of each complete cycle is effected by the movement of the trip plate by the advancing edge of the web to be cut.

As the trip plate swings backward and upward, the web passes thereunder and the trip plate rests upon the top of the web until after the cutting operation has been completed and the cut sheet has been advanced by the delivery table far enough to release the trip plate, which is immediately returned to its normal position by spring 89, and is prevented from swinging beyond its normal position, to be engaged by the following edge of the web, by means of the upper member of arm 84 engaging the fixed stop 85. In its advance to the trip plate, the web is held flat against the top of the delivery table by the rolls 67 and 76, which are mounted on the top of the delivery table and in the fore part of the trip carriage, respectively. When relatively large sheets are to be cut, several rolls similar to 67 may be employed, arranged in parallel order transversely of the frame of the delivery table and in advance of the position of the trip carriage.

When the advancing edge of the web encounters the barrier plate 160, the barrier carriage is moving toward the discharge end of the machine by screw shafts 61 and causes the rolls 157 carried by the arms 156 of the barrier carriage to ride up on the cams 171, thereby lifting the barrier in a substantial vertical direction until the barrier clears the edge of the cut sheet and the sheet passes under the barrier. Beginning with the initiation of the operation of the shear, by the actuation of the trip plate and until a complete cutting cycle has been completed the barrier carriage is moved bodily with the sliding frame or carriage 5 of the shear mechanism by the positive connection between the barrier carriage and said frame 5 afforded by the screw shafts 61, said shafts, however, sliding freely through the sleeves 142, which are carried in the bearings formed in the trip carriage castings, so that the trip carriage remains stationary. The distance between the lower knife of the shear mechanism and the barrier plate fixes and determines the uniform length of the sheets cut from the web and, in order to insure the engagement of the advance edge of the web with the barrier plate 160 before the web is engaged by the upper shoe of the clamp carried by the shear mechanism and, therefore, before the upper knife engages the web, the action of the trip plate in initiating the engagement of the clutch members is regulated by adjusting the gag 99 carried by the hub of the latch 98. After the gag has been so adjusted, any further adjustment thereof to compensate for variations in the speed of operation of the machine is effected automatically by the speed governor and the linkage connecting the same with the slide 121, as hereinbefore explained, so that the actual engagement of the forward edge of the web with the barrier will be effected before the actual cutting takes place, that is to say, before the web is engaged by the clamp carried by the shear mechanism and, therefore, before the upper knife engages the web immediately following the clamping of the web. The latter operation will, of course, arrest the forward movement of the web with respect to the knives and that portion of the web in front of the clamp will be deflected or buckled upwardly, so long as the clamping action is continued, this deflecting operation being assured by the initial upward bend or flexure imparted to the web by the rise in the top of the feed table. Immediately after the knives have operated to cut the sheet and the clamp is released, the web assumes its normal relation; this being assured in part by the action of the clamp 22 in stripping the front edge of the web from the upper knife upon the raising of the latter following the sheet cutting operation and, in part, by the normal resilience of the web which tends to flatten the latter.

As the shear moves forward during the cutting operation and the barrier carriage is moved with it, toward the latter portion of the forward movement of the shear frame 5, the barrier is elevated by the cams 171 and the stripper bar 165 frees the front edge of the cut sheet from the barrier and permits the cut sheet to be rapidly advanced over the take-away table by the belts 45, which travel at a faster speed than that of the travelling web, so that a sufficient distance will be left between the rear end of the cut sheets and the advance edge of the web to permit both the trip plate and the barrier to be returned to their normal positions before the edge of the web engages the trip plate to initiate another shearing operation. During the last half cycle of the shearing operations, the carriage 5 is moved backward and the frame 7 is swung upward. The rearward movement of the frame 5 effects the retraction of the barrier carriage and permits the rollers 157 to ride down the cam surfaces 171, thereby lowering the barrier into its normal position, just above the top of the delivery table, to be engaged by the next advancing edge of the web. As the cut sheet passes under the barrier and the latter is returned to its normal position, the lower edge of the barrier is prevented from damaging the web by the rollers 160', which ride on the surface of the web and prevent the barrier coming in contact therewith. As soon as the cut sheet passes from under the rollers, the barrier drops automatically to its normal position ready to be engaged by the next advancing edge of the continuous web.

The advance of the shear carriage 5 is continued a short interval after the cutting operation has been completed and the ram 112, which is connected to the carriage 5 by the bracket 60, to which one of the screw shafts is also connected to the carriage, engages the upper end of member 110 of rock lever 100 and swings said rock lever, against the tension of spring 106, in the reverse direction, so that the shoulder or detent 101 is reengaged by the latch 98 and said rock lever is locked in its normal position, when the pawl 95 and the latch 98 are permitted to swing back to normal, when the cut sheet passes from under the trip plate 83.

The machine is so operated that the speed of the cutter carriage or slide 5, in the direction of movement of the web, is somewhat less than the speed of the moving web, so that, when the front edge of the web engages the barrier, the web is actually moving faster than the barrier, which latter is connected to and moves with the cutter carriage. This would produce an undue stress or longitudinal pressure on the web, if means for relieving such pressure were not afforded by the preliminary deflection or upward curvature imparted to the web in advance of the cutters, the preliminary flexure being amplified or increased when the forward movement of the web is checked in part by the barrier or when the portion of the web immediately between the cutters is clamped to the cutter carriage by the clamping device, as described. In other words, the deflecting section 3 in the feed table is provided to produce a flexion in front of the shear, in order to insure that the section of the web beyond the shear and between the blades and the barrier shall not be subjected to excessive pressure due to the travel of the web, as it is essential that this section, to wit, that between the blades and the barrier, and which constitutes the sheet to be cut, be maintained as a plain flat surface without distortion.

It is essential that the barrier be so positioned relatively to the trip, the gag, the rest position of the knives, the cutting position of the knives and the clamping means, that the front end of the web shall always reach the face of the barrier and be forced against the same by the normal feeding movement of the web, before the clamp is actuated to lock the web to the cutter carriage and thereby reduce the speed of travel of the portion of the web between the knives and the barrier to the speed of movement of the said cutter carriage. As the speed of the travelling web in advance of the clamp is not reduced, undue and possibly disruptive pressure would be applied to the web, if the preliminary flexure or upward bend had not been imparted thereto by the section 3 of the feed table. As the web will necessarily take the path of least resistance to its forward movement, it will follow the general direction of the preliminary flexure and increase the latter and thereby take care of the surplus stock of the web, which would otherwise tend to buckle up in front of the clamp. This operation will be insured by setting the barrier relatively near the trip, so that the forward edge of the web will engage the barrier before the clamp has engaged the web. Inasmuch as the trip initiates the cutting operation, the barrier must be set with respect to the trip, so that the time required for the forward edge of the web to overtake and rest against the barrier, after said forward edge has actuated the trip, will be less than the time required for the upper member of the clamp to move from a position of rest to engagement with the web. It will be apparent that it is possible to set the barrier so far beyond the trip plate that the front edge of the web will not reach the barrier until after the clamp has descended. Such an adjustment will not result in sheets of uniform length being cut from the web and no setting of the gag will compensate for the resultant variations in the length of the web between the clamp and the barrier. In other words, precise sheet lengths are insured only when the barrier is so close to the trip plate and the gag is so set that the trip plate actuates the clutch at such time that the front edge of the web contacts with the barrier and the web in front of the shear and over the deflecting section 3 of the table starts to lift and has actually lifted a definite amount above said deflecting section, before the clamp has descended far enough to engage the web, which, of course, is before the knives enter the web to cut the sheet.

It will thus be seen that the machine, as constructed, will insure the cutting of sheets of uniform length for a given setting and that, when sheets of different lengths are to be cut, the machine may be readily adjusted to this end, by operating the screw shafts 61, either by means of the electric motor geared to the operating means for rotating said shafts or by the hand crank provided for that purpose, and, irrespective of the lengths of the sheets to be cut, substantial uniformity of the lengths for each setting will be insured by the coaction of the speed governor and the gag controlling the engagement of the pawl with the latch, which latter effects the release of the movable clutch member to initiate each cycle of operations of the shearing device and by the construction of the feed table, which produces the initial flexure of the web to insure the taking up of the surplus stock of the web in advance of the cutters, during the brief interval that the web is engaged by the knives and by the clamp associated therewith, and no portion of this surplus extends beyond the knives, but the exact length of the web to form the desired sheet is disposed between the knives and the barrier without any deviation from a plane surface and without any undue stress being imposed on the web in the direction of its movement.

What we claim is:

1. The combination with flying shearing means for transversely cutting a web of moving material, of positively actuated means controlled by the approach of said web for intermittently initiating operation of said shearing means, means for automatically varying the instant of functioning of the web controlled means for initiating operations of the shearing means in accordance with the speed of the machine, and a barrier movable with said shearing means to regulate the length of the cut sheets.

2. The combination with shearing means, comprising relatively moving blades for transversely cutting a web of moving material, of positively actuated means controlled by the aforesaid web of material for bodily reciprocating said shearing means, said actuated means including a trip plate fixed with relation to the shearing means, means for automatically varying the instant of functioning of the trip plate for initiation of the shearing operations by and in accordance with the speed of the machine and a barrier movable with said shearing means to regulate the length of the cut sheets.

3. The combination with shearing means, comprising relatively moving blades for transversely cutting a web of moving material, of positively actuated means controlled by the aforesaid web of material for bodily reciprocating said shearing means, said actuated means including a trip plate fixed with relation to the shearing means, means for automatically varying the initiation of the shearing operations by the trip plate by and in accordance with the speed of the machine, a barrier movable with said shearing means to regulate the length of the cut sheets and means for varying the relation of the trip plate and the barrier with respect to the shearing means for cutting sheets of different lengths.

4. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism engaged by said web for initiating the operation of said means, and a barrier connected with said frame to regulate the length of the cut sheets.

5. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism engaged by said web for initiating the operation of said means, a barrier movable with said frame to engage the web and regulate the length of the cut sheets, and means for releasing the barrier from the web at predetermined times.

6. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism engaged by said web for initiating the operation of said means, a barrier connected with said frame to engage the web and regulate the length of the cut sheets, and means for releasing the barrier from the web at predetermined times.

7. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a trip plate engaged by said web for initiating the operation of said means, a barrier connected with said frame to regulate the length of the cut sheets, and means for adjusting the distance between the trip plate and the barrier to time the tripping operation with respect to the engagement of the web with the barrier.

8. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, and a vertically movable barrier on said barrier carriage to regulate the length of the cut sheets.

9. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame and slidable on the trip carriage, and a vertically movable barrier on said barrier carriage to regulate the length of the cut sheets.

10. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, and means for adjusting the trip carriage and barrier carriage relative to the cutter frame to cut sheets of different predetermined lengths.

11. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, and means associated with said trip mechanism for varying the time of initiating the operation of said actuating means in accordance with variations in the speed of the machine.

12. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, means associated with said trip mechanism for varying the time of initiating the operation of said actuating means in accordance with variations in the speed of the machine, and means for adjusting the trip carriage and barrier carriage relatively to the cutter frame to cut sheets of different predetermined lengths.

13. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, and a vertically movable barrier on said barrier frame to regulate the length of the cut sheets.

14. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, trip mechanism engaged by said web for initiating the operation of said means, a barrier connected with said frame to regulate the length of the cut sheets, and cam connections between the trip mechanism and said barrier to effect the release of the latter from the web at predetermined times.

15. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, a vertically movable barrier on said barrier carriage to regulate the length of the cut sheets, and cam connections between said barrier and said trip carriage to effect the vertical movements of said barrier.

16. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, a vertically movable barrier on said barrier carriage to regulate the length of the cut sheets, cam connections between said barrier and said trip carriage to effect the vertical movements of said barrier, and means in the connections between the trip plate and the actuating means for varying the time of initiating the operations of said actuating means in accordance with variations in the speed of the machine.

17. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a slidably mounted barrier carriage, a barrier pivoted to said barrier carriage, shafts connecting the barrier carriage with the cutter frame, and connections between the trip carriage and the barrier carriage to raise and lower the barrier as the barrier carriage is reciprocated.

18. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a slidably mounted barrier carriage, a barrier on said barrier carriage, screw shafts connecting the barrier carriage with the cutter frame to effect joint reciprocatory movements thereof and adjustment of the barrier independently of the cutter frame when the shafts are rotated, and connections between the trip carriage and the barrier carriage to raise and lower the barrier as the barrier carriage is reciprocated.

19. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a slidably mounted barrier carriage, a barrier pivoted to said barrier carriage, screw shafts connecting the barrier carriage with the cutter frame to effect joint reciprocatory movements thereof and adjustment of the barrier carriage independently of the cutter frame when the shafts are rotated, connections between said shaft and trip carriage permitting free reciprocation of the shafts and effecting concurrent adjustment of the trip carriage with the barrier carriage when said shafts are rotated, and connections between the trip carriage and the barrier carriage to raise and lower the barrier as the barrier carriage is reciprocated.

20. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a slidably mounted barrier carriage, a barrier pivoted to said barrier carriage, screw shafts engaging threaded nuts on the barrier carriage to connect the same with the cutter frame for concurrent reciprocation therewith and adjustment of the barrier carriage independently of the frame when the shafts are rotated, sleeves carried by the trip carriage splined to the screw shafts to permit free reciprocation of said shafts, worm gears splined to said sleeves and held against longitudinal movement on the trip carriage, longitudinal racks on the delivery table engaged by said worm gears, whereby rotation of the screw shafts will effect concurrent adjustment of the trip carriage with the barrier carriage, and connections between the trip carriage and the barrier carriage to raise and lower the barrier as the barrier carriage is reciprocated.

21. Shear mechanism for cutting a web of moving material, comprising a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the later, a slidably mounted barrier carriage, a barrier mounted on said barrier carriage, screw shafts engaging threaded nuts on the barrier carriage to connect the same with the cutter frame for concurrent reciprocation therewith and adjustment of the barrier carriage independently of the frame when the shafts are rotated, sleeves carried by the trip carriage splined to the screw shafts to permit free reciprocation of said shafts, worm gears splined to said sleeves and held against longitudinal movement on the trip carriage, longitudinal racks on the delivery table engaged by said worm gears, whereby rotation of the screw shafts will effect concurrent adjustment of the trip carriage with the barrier carriage, connections between the trip carriage and the barrier carriage to raise and lower the barrier as the barrier carriage is reciprocated, and means for simultaneously rotating said screw shafts in either direction.

22. In a shearing machine for cutting a web of moving material including positively actuated means controlled by the web for bodily reciprocating the shearing means longitudinally of the web, a trip mechanism including a trip carriage, a trip plate thereon, connections between the trip plate and said positively actuated means to control the operations of the latter, a barrier carriage connected to and movable with the reciprocating shearing means, a barrier on said barrier carriage, and means connecting the barrier with the trip carriage for raising and lowering the barrier as the barrier carriage reciprocates.

23. In a shearing machine for cutting a web of moving material including positively actuated means controlled by the web for bodily reciprocating the shearing means longitudinally of the web, a trip mechanism including a trip carriage, a trip plate thereon, connections between the trip plate and said positively actuated means to control the operations of the latter, a barrier carriage connected to and movable with the reciprocating shearing means, a barrier on said barrier carriage, cams on the trip carriage, and abutments on the barrier engaging said cams to raise and lower the barrier as the barrier carriage reciprocates.

24. The combination of means for transversely cutting a web of moving material, a clutch including a constantly driven member and an intermittently connected member for operating said means, means for engaging said clutch members for each cutting operation, a trip plate engaged by said web, a pawl operated by said trip plate, a latch tripped by said pawl for actuating the clutch engaging means, an adjustable gag interposed between the pawl and the latch to vary the time of operation of the latch, and a speed governor operated from a continuously driven rotary part of the machine for varying the position of the gag.

25. Shear mechanism for cutting a web of moving material, comprising a carriage slidable in a direction parallel to the movement of the material, a frame pivoted thereto, a blade on said frame, a stationary blade on said carriage, means for simultaneously reciprocating said carriage and swinging said frame, and clamp members on the carriage and frame respectively to hold the web stationary relatively to the carriage during the cutting operation.

26. Shear mechanism for cutting a web of moving material, comprising a carriage slidable in a direction parallel to the movement of the material, a frame pivoted thereto, a blade on said frame, a stationary blade on said carriage, means for simultaneously reciprocating said carriage and swinging said frame, a fixed clamping plate on the carriage, and a yielding clamping plate on the frame cooperative with said fixed clamping plate to hold the web stationary relatively to the carriage during the cutting operation.

27. Shear mechanism for cutting a web of moving material, comprising a carriage slidable in a direction parallel to the movement of the material, a frame pivoted thereto, a blade on said frame, a stationary blade on said carriage, means for simultaneously reciprocating said carriage and swinging said frame, a fixed clamping plate on the carriage, a yielding clamping plate on the frame cooperative with said fixed clamping plate to hold the web stationary relatively to the carriage during the cutting operation, and stops on the fixed plate to limit the downward movement of the yielding plate.

28. Shear mechanism for cutting a web of moving material, comprising a feed table including means for producing a preliminary flexure of the web, a frame slidable in a direction parallel to the direction of movement of the web, relatively movable cutting blades mounted on said frame, a crank shaft, connections between said crank shaft and frame for reciprocating the frame and moving the cutting blades relatively to each other, and positively actuated means for controlling the operation of said crank shaft, said means including a trip plate fixed with relation to said frame, and means for automatically varying the initiation of the operation of said crank shaft by and in accordance with the speed of the machine.

29. Shear mechanism for cutting a web of moving material, comprising a feed table including means for producing a preliminary flexure of the web, a frame slidable in a direction parallel to the direction of movement of the web, relatively movable cutting blades mounted on said frame, a crank shaft, connections between said crank shaft and frame for reciprocating the frame and moving the cutting blades relatively to each other, and positively actuated means for controlling the operation of said crank shaft, said means including a clutch, a trip plate fixed with relation to said frame, and means interposed between the trip plate and the clutch to vary the initiation of the operative engagement of the clutch in accordance with variations in the speed of the machine.

30. Shear mechanism for cutting a web of moving material, comprising a feed table including means for producing a preliminary flexure of the web, a frame slidable in a direction parallel to the direction of movement of the web, relatively movable cutting blades mounted on said frame, a crank shaft, connections whereby the rotation of the crank shaft reciprocates said frame and moves the cutting blades relatively to each other to cut the web, and means actuated by the web for controlling the operation of the crank shaft, said means including a trip plate fixed with relation to said frame, and means actuated by a continuously rotating part of the machine for varying the effective operation of said trip plate to initiate the rotation of the crank shaft by and in accordance with the variations in speed of the machine.

31. Shear mechanism for transversely cutting a web of moving material, comprising a feed table including means for producing a preliminary flexure of the web, a movable blade, a relatively stationary blade, positively actuated means under control of the web to reciprocate both blades in a direction at right-angles to the cut and actuate the movable blade, said means including a trip plate fixed with relation to said blades, a clutch and connections between the trip plate and clutch, and means interposed in said connections for automatically varying the actuation of the clutch in accordance with variations in the speed of the machine.

32. Shear mechanism for cutting a web of moving material, comprising a feed table including means for producing a preliminary flexure of the web, a frame slidable in a direction parallel to the direction of movement of the web, relatively movable cutting blades mounted on said frame, a crank shaft, connections between said crank shaft and frame for reciprocating the frame and moving the cutting blades relatively to each other, positively actuated means for controlling the operation of said crank shaft, said means including a clutch, a trip plate fixed relatively to said frame and connections between said trip plate and clutch, and means interposed in said connections to vary the time of the actuation of the clutch in accordance with variations in the speed of the machine.

33. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, trip mechanism engaged by said web for initiating the operation of said means, and a barrier connected with said frame to regulate the length of the cut sheets.

34. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, and a vertically movable barrier on said barrier carriage to regulate the length of the cut sheets.

35. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, and means for adjusting the trip carriage and barrier carriage relative to the cutter frame to cut sheets of different predetermined lengths.

36. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, and means associated with said trip mechanism for varying the time of initiating the operation of said actuating means in accordance with variations in the speed of the machine.

37. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, trip mechanism including a relatively fixed carriage with a trip plate thereon engaged by said web for initiating the operation of said actuating means, a barrier device including a barrier carriage connected to and moving with the cutter frame, a vertically movable barrier on said barrier carriage to regulate the length of the cut sheets, means associated with said trip mechanism for varying the time of initiating the operation of said actuating means in accordance with variations in the speed of the machine, and means for adjusting the trip carriage and barrier carriage relatively to the cutter frame to cut sheets of different predetermined lengths.

38. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, and a vertically movable barrier on said barrier frame to regulate the length of the cut sheets.

39. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, a vertically movable barrier on said barrier carriage to regulate the length of the cut sheets, and cam connections between said barrier and said trip carriage to effect the vertical movements of said barrier.

40. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, a vertically movable barrier on said barrier carriage to regulate the length of the cut sheets, cam connections between said barrier and said trip carriage to effect the vertical movements of said barrier, and means in the connections between the trip plate and the actuating means for varying the time of initiating the operations of said actuating means in accordance with variations in the speed of the machine.

41. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage connected to and movable with the cutter frame, a barrier pivoted to said barrier carriage, shafts connecting the barrier carriage with the cutter frame, and connections between the trip carriage and the barrier carriage to raise and lower the barrier as the barrier carriage is reciprocated.

42. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operation of the latter, a barrier carriage slidably mounted on the trip carriage, a barrier pivoted to said barrier carriage, screw shafts connecting the barrier carriage with the cutter frame to effect joint reciprocatory movements thereof and adjustment of the barrier carriage independently of the cutter frame when the shafts are rotated, connections between said shaft and trip carriage permitting free reciprocation of the shafts and effecting concurrent adjustment of the trip carriage with the barrier carriage when said shafts are rotated, and connections between the trip carriage and the barrier carriage to raise and lower the barrier as the barrier carriage is reciprocated.

43. Shear mechanism for cutting a web of moving material, comprising a feed table including means for producing a preliminary flexure of the web, a frame slidable in a direction parallel to the direction of movement of the web, relatively movable cutting blades mounted on said frame, actuating means for reciprocating said frame and moving said blades relatively to each other, a delivery table, a trip carriage adjustably fixed to said table, a trip plate on said carriage in the path of movement of the web, connections between the trip plate and the actuating means to initiate the operations of the latter, a barrier carriage connected to and movable with the cutter frame, a barrier pivoted to said barrier carriage, screw shafts engaging threaded nuts on the barrier carriage to connect the same with the cutter frame for concurrent reciprocation therewith and adjustment of the barrier carriage independently of the frame when the shafts are rotated, sleeves carried by the trip carriage splined to the screw shafts to permit free reciprocation of said shafts, worm gears splined to said sleeves and held against longitudinal movement on the trip carriage, longitudinal racks on the delivery table engaged by said worm gears, whereby rotation of the screw shafts will effect concurrent adjustment of the trip carriage with the barrier carriage, and connections between the trip carriage and the barrier carriage to raise and lower the barrier as the barrier carriage is reciprocated.

44. In a shearing machine for cutting a web of moving material comprising a feed table including means for producing a preliminary flexure of the web, positively actuated means controlled by the web for bodily reciprocating the shearing means longitudinally of the web, a trip mechanism including a trip carriage, a trip plate thereon, connections between the trip plate and said positively actuated means to control the operations of the latter, a barrier carriage connected to and movable with the reciprocating shearing means, a barrier on said barrier carriage, and means connecting the barrier with the trip carriage for raising and lowering the barrier as the barrier carriage reciprocates.

45. In a shearing machine for cutting a web of moving material comprising a feed table including means for producing a preliminary flexure of the web, positively actuated means controlled by the web for bodily reciprocating the shearing means longitudinally of the web, a trip mechanism including a trip carriage, a trip plate thereon, connections between the trip plate and said positively actuated means to control the operations of the latter, a barrier carriage connected to and movable with the reciprocating shearing means, a barrier on said barrier carriage, cams on the trip carriage, and abutments on the barrier engaging said cams to raise and lower the barrier as the barrier carriage reciprocates.

EDGAR M. HAWKINS.
OTTO M. HOCH.